(12) United States Patent
Muneishi (10) Patent No.: US 11,486,648 B2
(45) Date of Patent: Nov. 1, 2022

(54) HEAT EXCHANGER

(71) Applicant: KYOCERA Corporation, Kyoto (JP)

(72) Inventor: Takeshi Muneishi, Kusatsu (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 16/481,748

(22) PCT Filed: Jan. 29, 2018

(86) PCT No.: PCT/JP2018/002763
§ 371 (c)(1),
(2) Date: Jul. 29, 2019

(87) PCT Pub. No.: WO2018/139649
PCT Pub. Date: Aug. 2, 2018

(65) Prior Publication Data
US 2019/0390912 A1 Dec. 26, 2019

(30) Foreign Application Priority Data
Jan. 30, 2017 (JP) .............................. JP2017-014390

(51) Int. Cl.
*F28D 1/03* (2006.01)
*F28F 21/04* (2006.01)
(Continued)

(52) U.S. Cl.
CPC .................. *F28D 1/03* (2013.01); *F28F 1/12* (2013.01); *F28F 21/04* (2013.01);
(Continued)

(58) Field of Classification Search
CPC ........ F28D 1/03; F28D 1/0366; F28D 1/0375; F28D 1/0426; F28D 1/0452;
(Continued)

(56) References Cited

U.S. PATENT DOCUMENTS

| 4,401,155 A | 8/1983 | Royal et al. |
| 4,487,256 A * | 12/1984 | Lutjens .................. F28F 1/20 62/50.7 |

(Continued)

FOREIGN PATENT DOCUMENTS

| EP | 1189009 A1 | 3/2002 | |
| EP | 1043560 B1 * | 1/2004 | ........... F28D 1/0233 |

(Continued)

OTHER PUBLICATIONS

Opposed Definition—Merriam-Webster Online Dictionary (Year: 2020).*

(Continued)

*Primary Examiner* — Jenna M Hopkins
(74) *Attorney, Agent, or Firm* — Volpe Koenig (57) ABSTRACT

A heat exchanger includes a plurality of first members, and a plurality of second members located between adjacent first members of the plurality of first members. The plurality of first members each include a plurality of openings and a first flow path connected to the plurality of openings. The plurality of second members each include a second flow path connected to the openings of the adjacent first members. The plurality of openings and the first flow path of the first member, and the second flow path of the second member define a flow path for a first fluid. A region between the adjacent first members defines a flow path for a second fluid. The heat exchanger further includes a third member extending toward the region on the first member.

13 Claims, 7 Drawing Sheets

(51) Int. Cl.
*F28F 1/12* (2006.01)
*F28D 15/02* (2006.01)
*F28F 3/04* (2006.01)
*F28F 1/02* (2006.01)

(52) U.S. Cl.
CPC ........ *F28D 2015/0225* (2013.01); *F28F 3/04* (2013.01); *F28F 2001/027* (2013.01); *F28F 2215/10* (2013.01); *F28F 2255/18* (2013.01)

(58) Field of Classification Search
CPC ............ F28D 1/05308; F28D 1/05316; F28D 1/05341; F28D 1/05333; F28D 1/05358; F28D 1/05366; F28D 1/05383; F28D 1/05391; F28D 1/053; F28D 2015/0225; F28D 1/12; F28F 3/04; F28F 3/02; F28F 3/022; F28F 3/08; F28F 3/086; F28F 21/04; F28F 2215/10; F28F 2215/04; F28F 2215/02; F28F 9/001; F28F 2280/06; F28F 2001/027; F28F 1/12; F28F 2009/0292
See application file for complete search history.

(56) References Cited

U.S. PATENT DOCUMENTS

| | | | | |
|---|---|---|---|---|
| 4,524,823 | A * | 6/1985 | Hummel | F25B 39/028 165/174 |
| 5,758,720 | A | 6/1998 | Moser | |
| 7,637,313 | B2 * | 12/2009 | Taniguchi | F28F 3/086 165/148 |
| 8,069,678 | B1 * | 12/2011 | Bernert | F17C 7/04 62/50.2 |
| 9,429,373 | B2 * | 8/2016 | Park | F28F 1/325 |
| 9,655,287 | B1 * | 5/2017 | Babcock | H05K 1/0203 |
| 9,752,805 | B2 * | 9/2017 | Aso | F25B 30/04 |
| 2001/0032718 | A1 * | 10/2001 | Sheerin | F28F 1/16 165/130 |
| 2005/0189092 | A1 * | 9/2005 | Jahn | F28F 13/12 165/109.1 |
| 2008/0066888 | A1 * | 3/2008 | Tong | H01L 23/3677 165/80.3 |
| 2009/0025920 | A1 | 1/2009 | Colling | |
| 2012/0291998 | A1 * | 11/2012 | Anderson | F28F 9/0243 165/104.14 |
| 2013/0043013 | A1 * | 2/2013 | Iino | F28F 21/089 165/181 |
| 2013/0139538 | A1 * | 6/2013 | Aso | F28D 21/0015 62/324.1 |
| 2013/0206376 | A1 * | 8/2013 | Shikazono | F28D 1/0316 165/172 |
| 2017/0038148 | A1 | 2/2017 | Sekiguchi et al. | |
| 2017/0219302 | A1 | 8/2017 | Moriyama et al. | |

FOREIGN PATENT DOCUMENTS

| | | | |
|---|---|---|---|
| FR | 1253638 A | 2/1961 | |
| FR | 2918165 A1 * | 1/2009 | ............. F28F 9/264 |
| GB | 2466498 A1 | 6/2010 | |
| JP | 54-71253 U | 5/1979 | |
| JP | 61-295492 A | 12/1986 | |
| JP | H09113154 A * | 10/1995 | |
| JP | 08-303986 A | 11/1996 | |
| JP | 10062572 A * | 3/1998 | ................ F28F 3/04 |
| JP | 2005-300062 A | 10/2005 | |
| JP | 2008-510124 A | 4/2008 | |
| JP | 2015028416 A * | 2/2015 | |
| JP | 2016-108170 A | 6/2016 | |
| WO | 2008/020806 A1 | 2/2008 | |
| WO | 2015/093619 A1 | 6/2015 | |
| WO | 2016/017697 A1 | 2/2016 | |

OTHER PUBLICATIONS

Processing Techniques of a Silicon Carbide Heat Exchanger . . . —Pachaiyappan (Aug. 2015) (Year: 2015).*
JP H10-62572 English Machine Translation (Year: 1998).*
JPH09113154A English Machine Translation (Year: 1995).*
JP2015028416A English Machine Translation (Year: 2015).*
Japanese Office Action dated Sep. 20, 2022 for Japanese Patent Application No. 2021-165057.

* cited by examiner

HEAT EXCHANGER

CROSS-REFERENCE TO RELATED APPLICATIONS

This application is a national stage entry according to 35 U.S.C. 371 of International Application No. PCT/JP2018/002763 filed on Jan. 29, 2018, which claims priority to Japanese Patent Application No. 2017-014390 filed on Jan. 30, 2017, the contents of which are entirely incorporated herein by reference.

TECHNICAL FIELD

The present disclosure relates to a heat exchanger.

BACKGROUND

In the related art, a heat exchanger is used in a heat exchange system for cooling, heating, or the like. As an example of such a heat exchanger, Japanese Unexamined Patent Publication JP-A 2005-300062 (Patent Literature 1) proposes a heat exchanger including a plurality of substrates which are laminated, the plurality of substrates each including a plurality of strips arranged substantially in parallel, slits between the plurality of strips, and recesses extending continuously in a longitudinal direction on some surfaces of the plurality of strips, the strips of adjacent substrates being interconnected to define tubes, the respective recesses define internal flow paths, and the respective slits define external flow paths.

SUMMARY

A heat exchanger according to the disclosure includes a plurality of first members, and a plurality of second members located between adjacent first members of the plurality of first members. In addition, the plurality of first members each include a plurality of openings and a first flow path connected to the plurality of openings. In addition, the plurality of second members each include a second flow path connected to the openings of the adjacent first members. In addition, the plurality of openings and the first flow path of the first member, and the second flow path of the second member define a flow path for a first fluid. In addition, a region between the adjacent first members defines a flow path for a second fluid. Further, the heat exchanger further includes a third member extending toward the region on the first member.

DETAILED DESCRIPTION

The heat exchangers of today are required to provide improved heat exchange efficiency in addition to the response to miniaturization. The heat exchanger according to the disclosure has excellent heat exchange efficiency. Hereinafter, the heat exchanger according to the disclosure will be described in detail with reference to the drawings. Note that alphanumerical reference numerals are assigned to identify the heat exchangers in respective drawings, but except for the description of the configuration specific to each drawing, they will be described by simply referring numerals only.

The heat exchanger 10 according to the disclosure includes a plurality of first members 1. Here, in FIGS. 1 and 2, the heat exchanger 10a including three first members 1 is shown as an example. When the number of first members 1 is three or more, the heat exchanger 10 according to the disclosure is particularly suitable for miniaturization. Note that, the number of first members 1 is not limited to this, and may be two or more.

Figure 1:
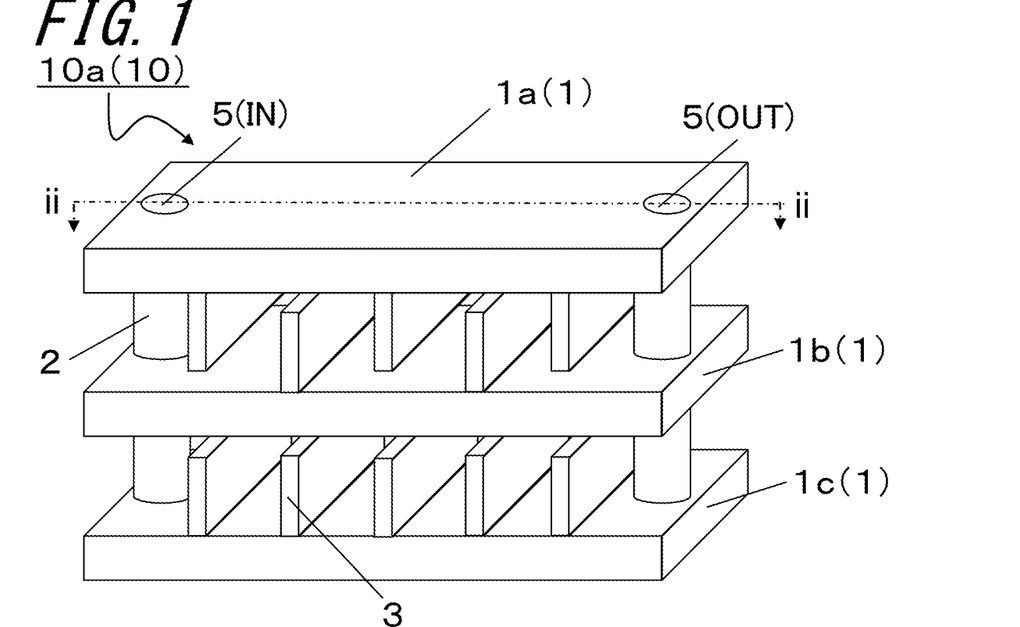
FIG. 1 is an external perspective view showing an example of a heat exchanger according to the disclosure.

In FIG. 1, although the example in which the shape of the first member 1 is a rectangular plate is shown, the shape of the first member 1 is not limited to this, and may be a disk, an elliptical plate, or the like.

Figure 2:
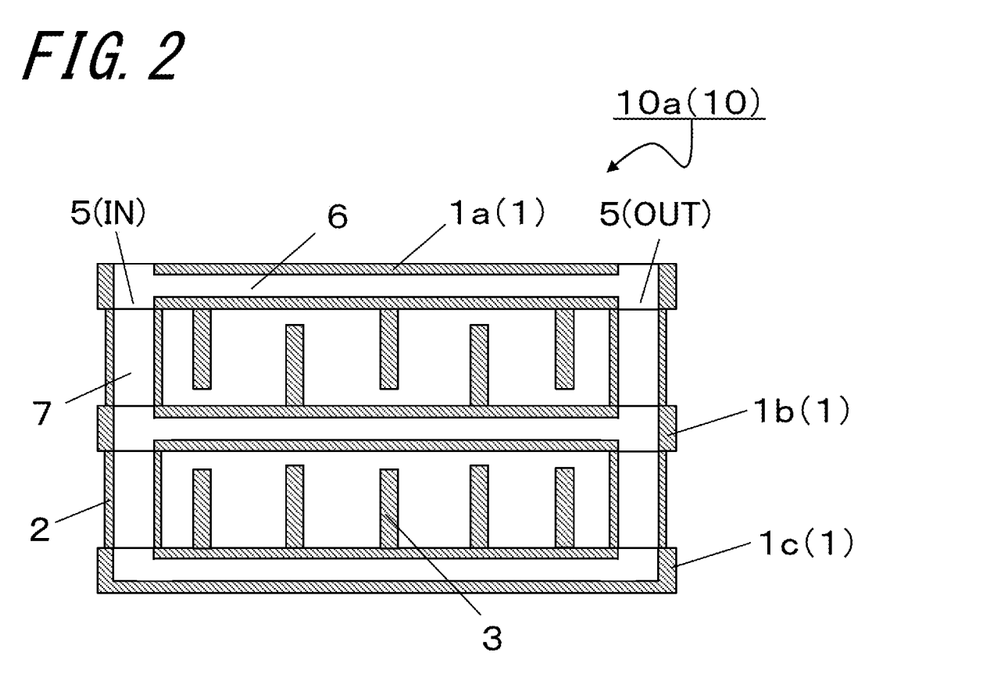
FIG. 2 is a cross-sectional view taken along the line ii-ii in FIG. 1.

Further, the first member 1 of the heat exchanger 10 according to the disclosure includes a plurality of openings 5 and a first flow path 6 connected to the openings 5. In FIGS. 1 and 2, an example is shown, in which, among the three first members 1, the upper first member 1a and the middle first member 1b include four openings 5, and the lower first member 1c includes two openings 5. The number of the openings 5 may be plural, and without limitation to the configurations shown in FIGS. 1 and 2, the configuration of the first members 1 including a different number of the openings 5 may be included.

Furthermore, the heat exchanger 10 according to the disclosure includes a plurality of second members 2 located between the adjacent first members 1. The second member 2 has a second flow path 7 connected to the openings 5 of the adjacent first members 1. The shape of the second member 2 may be any shape as long as it has the second flow path 7.

In the heat exchanger 10 according to the disclosure, the openings 5 and the first flow path 6 of the first members 1 and the second flow path 7 of the second members 2 define a flow path for the first fluid. Here, the flow path of the first fluid in the heat exchanger 10a shown in FIGS. 1 and 2 will be described. First, the first fluid is introduced from the opening 5IN of the upper first member 1a. Then, after passing the first flow path 6 of each of the first members 1, and the second flow path 7 of each of the second members 2, it is discharged from the opening 5OUT of the upper first member 1a.

Then, in the heat exchanger 10 of the disclosure, a region between the adjacent first members 1 defines a flow path for a second fluid. When the second fluid passes between the adjacent first members 1, heat exchange takes place between the first member 1 and the second member 2 through which the first fluid flows. Depending on the relationship in temperature between the first fluid and the second fluid, the second fluid may be cooled or heated. For the first fluid and the second fluid, liquid or gas may be used depending on the purpose. For example, the first fluid may be a liquid body such as water, and the second fluid may be a gaseous body such as a gas.

In addition, the heat exchanger 10 according to the disclosure further includes a third member 3 extending toward the region between the adjacent first members 1 on the first member 1. By disposing the third member 3, the flow of the second fluid is changed when the second fluid passes between the adjacent first members 1, so that the opportunities that the second fluid comes into contact with the first member 1 and the second the member 2 are increased. Furthermore, the third member 3 is connected to the first member 1, so that the third member 3 is cooled or heated by the first fluid flowing through the first flow path 6 of the first member 1, which results in heat exchange occurring between the third member 3 and the second fluid. Therefore, the heat exchanger 10 according to the disclosure that satisfies such a configuration has excellent heat exchange efficiency.

In this example, the third member 3 may have any shape, but may have a shape extending along a direction in which the second fluid flows, such that a contact area between the third member 3 and the second fluid can be increased without excessively interfering with the flow of the second fluid.

In the following description, the second fluid is described as flowing from the front to the depth in the drawing plane. Moreover, in the description, a shorter direction of the first member 1 is described as the width direction. Based on this, the third member 3 in FIG. 1 has the shape of a rectangular plate extending along the width direction of the first member 1.

In addition, as shown in the heat exchanger 10*a* of FIGS. 1 and 2, a plurality of third members 3 may be located at intervals. When such a configuration is satisfied, due to the presence of the plurality of third members 3 performing heat exchange with the second fluid, heat exchange efficiency is improved.

Figure 3:
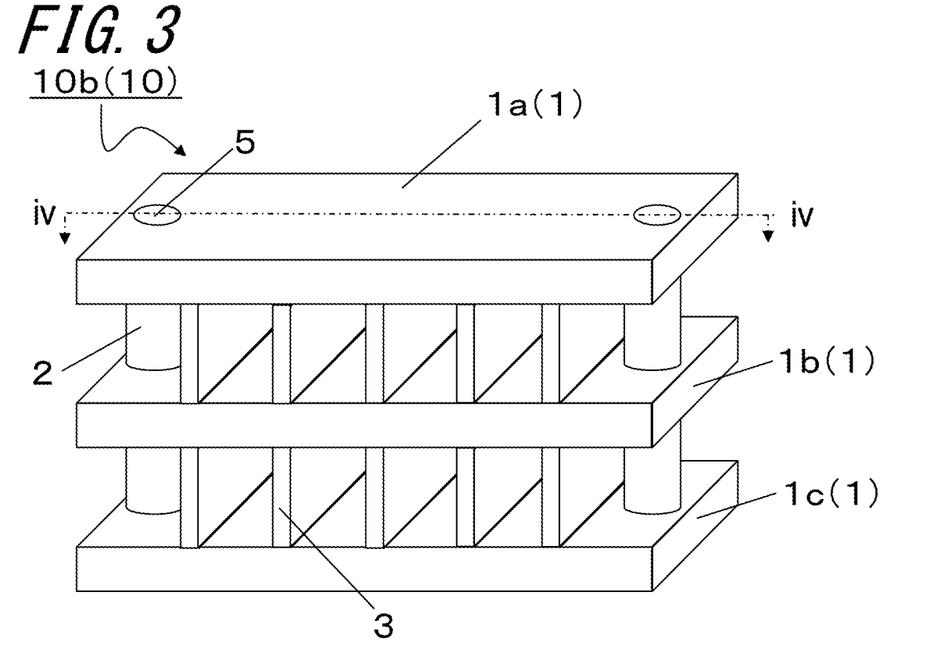
FIG. 3 is an external perspective view showing another example of the heat exchanger according to the disclosure.
Figure 4:
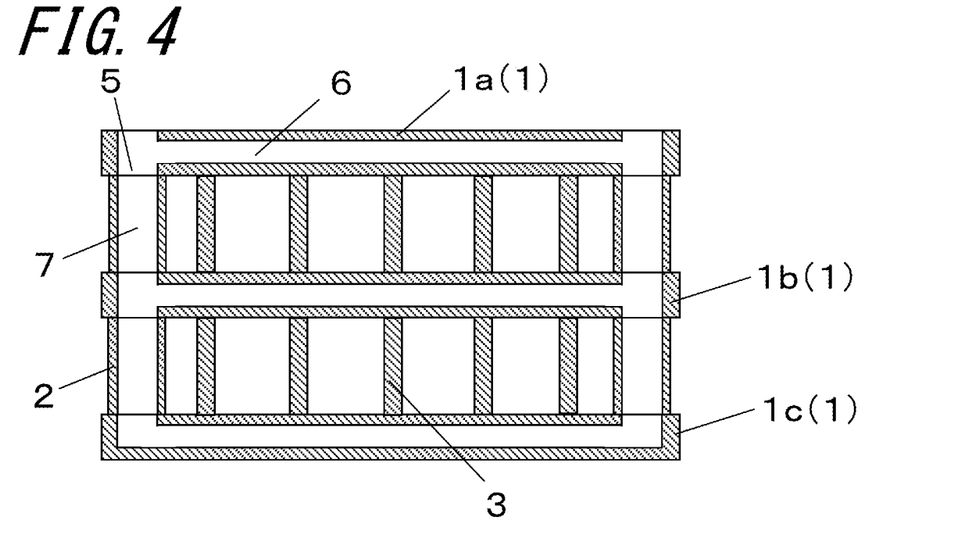
FIG. 4 is a cross-sectional view taken along the line iv-iv in FIG. 3.

Moreover, the third members 3 may be connected to each of the first members 1 opposed thereto, as in the heat exchanger 10*b* shown in FIGS. 3 and 4. When such a configuration is satisfied, the third member 3 is cooled or heated by the first fluid flowing through the first flow path 6 of the two first members 1 to which the third members 3 are connected, so that heat exchange between the third member 3 and the second fluid is performed more efficiently.

Figure 5:
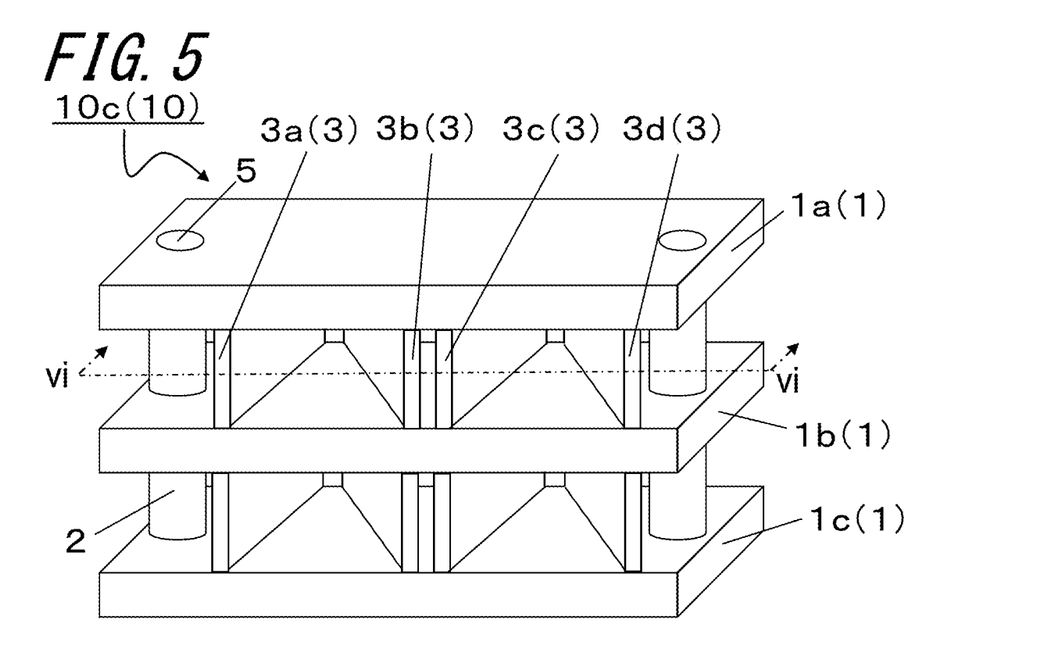
FIG. 5 is an external perspective view showing another example of the heat exchanger according to the disclosure.
Figure 6:
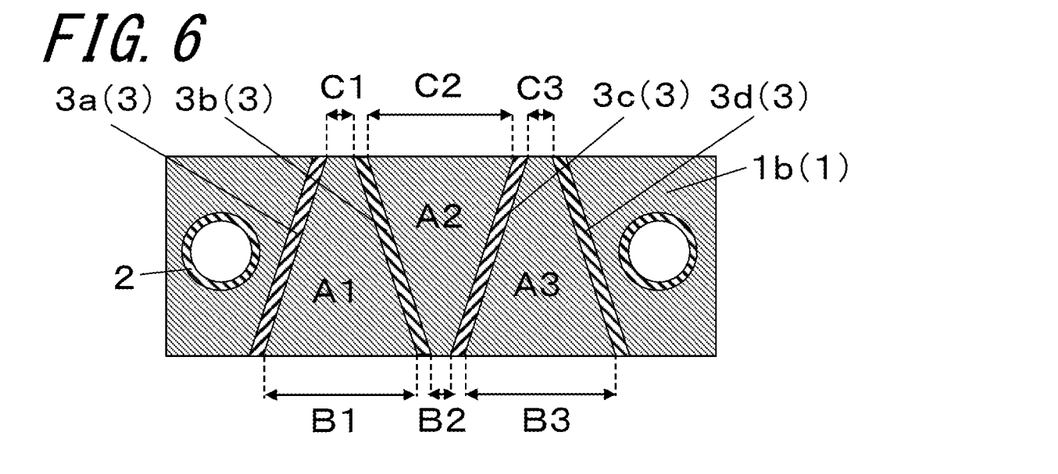
FIG. 6 is a cross-sectional view taken along the line vi-vi in FIG. 5.

Moreover, like the heat exchanger 10*c* shown in FIGS. 5 and 6, widths at the inlet and the outlet of the flow path for the second fluid in the adjacent third members 3 may be different from each other. Here, according to the heat exchanger 10*c* shown in FIGS. 5 and 6, the adjacent third members 3 indicate a set of the third member 3*a* and the third member 3*b*, a set of the third member 3*b* and the third member 3*c*, and a set of the third member 3*c* and the third member 3*d*.

Then, taking the third member 3*a* and the third member 3*b* as an example, as shown in FIG. 6, the fact that the widths at the inlet and the outlet of the flow path for the second fluid are different from each other means that lengths of the flow path width B1 at the inlet and the flow path width C1 at the outlet are different from each other. The flow path width B1 at the inlet is the shortest distance between an end of the third member 3*a* and an end of the third member 3*b* on the inlet of the second fluid. The flow path width C1 at the outlet is the shortest distance between an end of the third member 3*a* and an end of the third member 3*b* on the outlet of the second fluid.

When such a configuration is satisfied, when the second fluid flows between the adjacent third members 3, the flow velocity of the second fluid is increased, and the turbulent flow is generated, thus improving the heat exchange efficiency. A narrower flow path width of the flow path width B1 at the inlet and the flow path width C1 at the outlet, is 0.5 mm or more, for example.

Further, as in the heat exchanger 10*c* shown in FIGS. 5 and 6, when the flow path for the second fluid between the adjacent third members 3 is referred to as a flow path A, a plurality of flow paths A are provided, and adjacent flow paths A may have different relationships in the respective flow paths A between the widths at the inlet and the outlet of the flow path for the second fluid.

Here, in the heat exchanger 10*c*, how the adjacent flow paths A have different relationships in the respective flow paths A between the widths at the inlet and the outlet of the flow path for the second fluid will be described with reference to FIG. 6. First, it is assumed that A1 denotes the flow path of the second fluid between the third member 3*a* and the third member 3*b*, A2 denotes the flow path of the second fluid between the third member 3*b* and the third member 3*c*, and A3 denotes the flow path of the second fluid between the third member 3*c* and the third member 3*d*. In the flow path A1, the magnitude relationship between the lengths of the flow path width B1 at the inlet and the flow path width C1 at the outlet is B1>C1. In the flow path A2, the magnitude relationship between the lengths of the flow path width B2 at the inlet and the flow path width C2 at the outlet is B2<C2. In the flow path A3, the magnitude relationship between the lengths of the flow path width B3 at the inlet and the flow path width C3 at the outlet is B3>C3. Thus, in the adjacent flow paths A (flow paths A1 and A2, flow paths A2 and A3), the magnitude relationships of the lengths of the flow path width at the inlet and the flow path width at the outlet in each flow path A are different from each other. When such a configuration is satisfied, the turbulent flow is generated when the second fluid flows in each flow path A, resulting in improved heat exchange efficiency.

Figure 7:
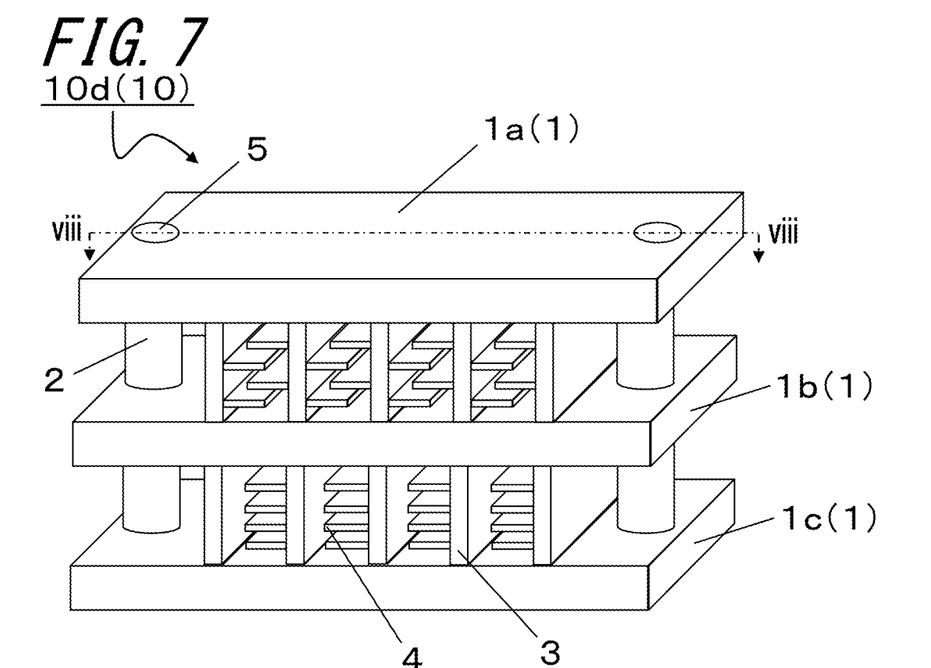
FIG. 7 is an external perspective view showing another example of the heat exchanger according to the disclosure.
Figure 8:
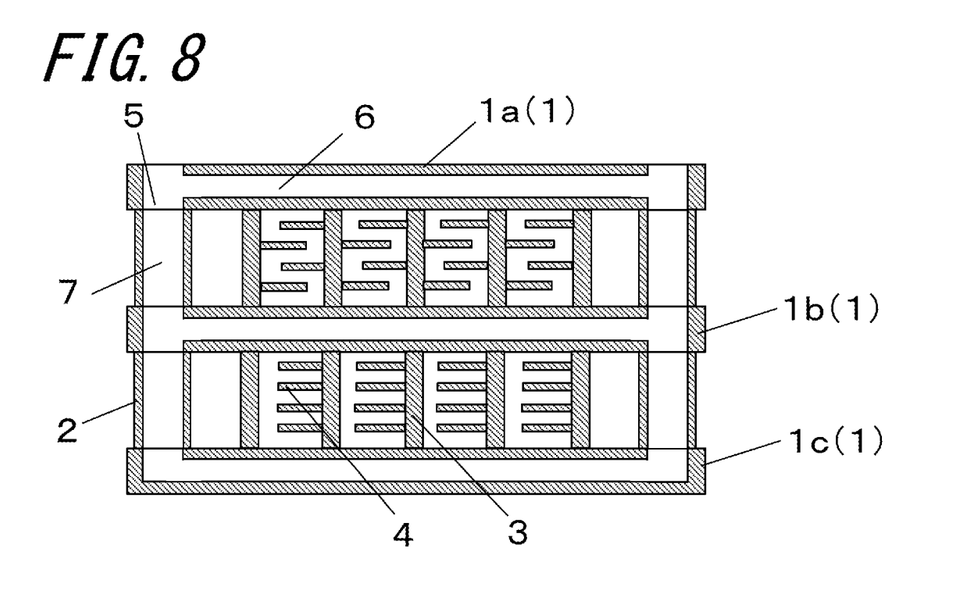
FIG. 8 is a cross-sectional view taken along the line viii-viii in FIG. 7.

In addition, as in the heat exchanger 10*d* shown in FIGS. 7 and 8, a fourth member 4 may be further included, extending from the third member 3 toward the region between the adjacent first members 1. When such a configuration is satisfied, in the fourth member 4, heat exchange is also performed with the second fluid through not only by the first member 1, the second member 2 and the third member 3, but also through the fourth member 4 which is cooled or heated via the third members 3 by the first fluid flowing through the first flow path 6 of the first member 1, whereby the heat exchange efficiency is improved.

In this example, the fourth member 4 may have any shape, but, like the third member 3, may have a shape extending along a direction in which the second fluid flows such that a contact area between the fourth member 4 and the second fluid can be increased without excessively interfering with the flow of the second fluid. In FIG. 7, an example in which the fourth member 4 has a rectangular plate shape extending along the width direction of the first member 1 is shown.

In addition, a plurality of fourth members 4 may be located at intervals as in the heat exchanger 10d shown in FIGS. 7 and 8. When such a configuration is satisfied, due to the presence of the plurality of fourth members 4 that perform heat exchange with the second fluid are present, heat exchange efficiency is improved.

Figure 9:
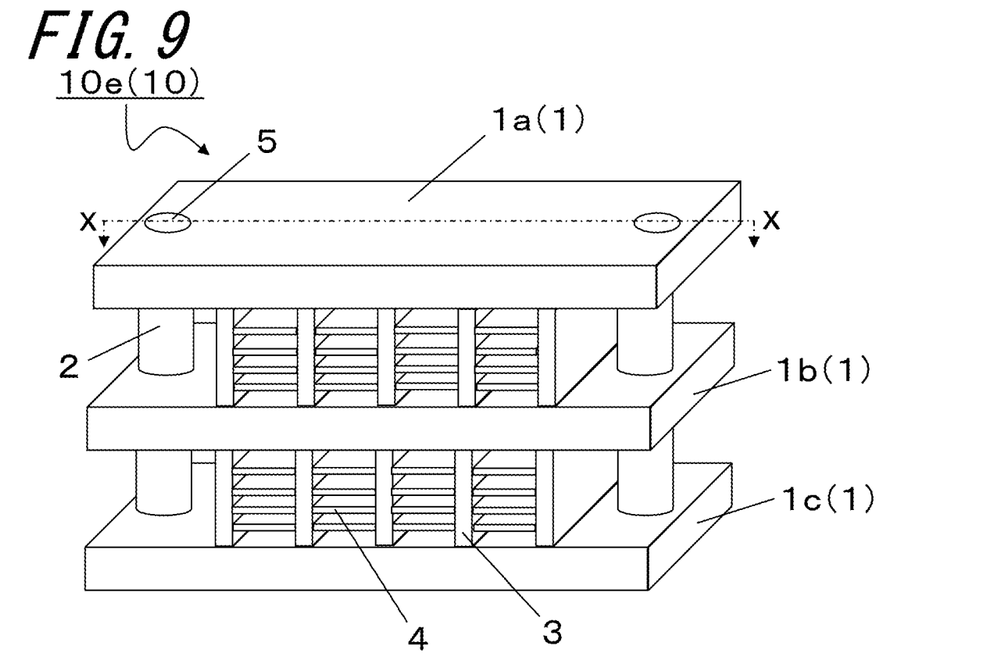
FIG. 9 is an external perspective view showing another example of the heat exchanger according to the disclosure.
Figure 10:
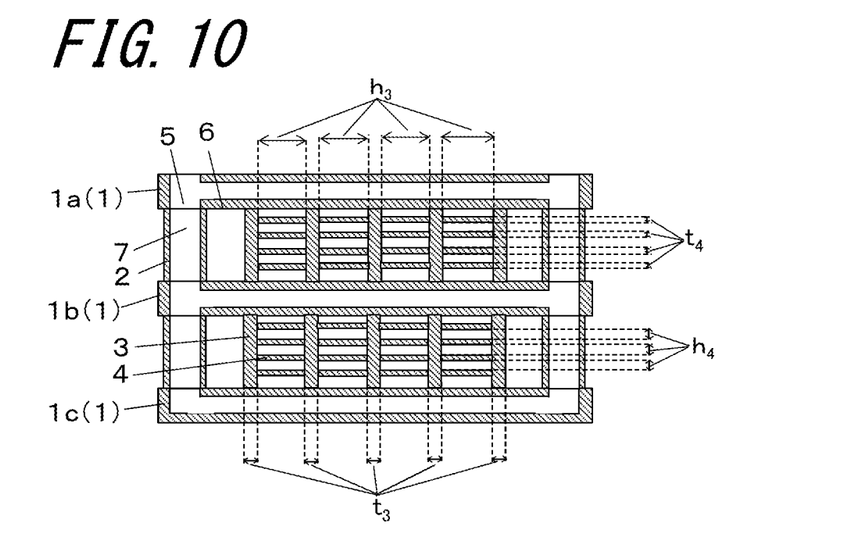
FIG. 10 is a cross-sectional view taken along line x-x in FIG. 9.

Moreover, the fourth member 4 may be connected to each of the third members 3 opposed thereto, as in the heat exchanger 10e shown to FIGS. 9 and 10. When such a configuration is satisfied, cooling or heating is performed by the first fluid flowing through the first flow path 6 of the two first members 1 through the two third members 3 to which the fourth members 4 are connected, and accordingly, the heat exchange between the fourth member 4 and the second fluid is performed more efficiently.

Figure 11:
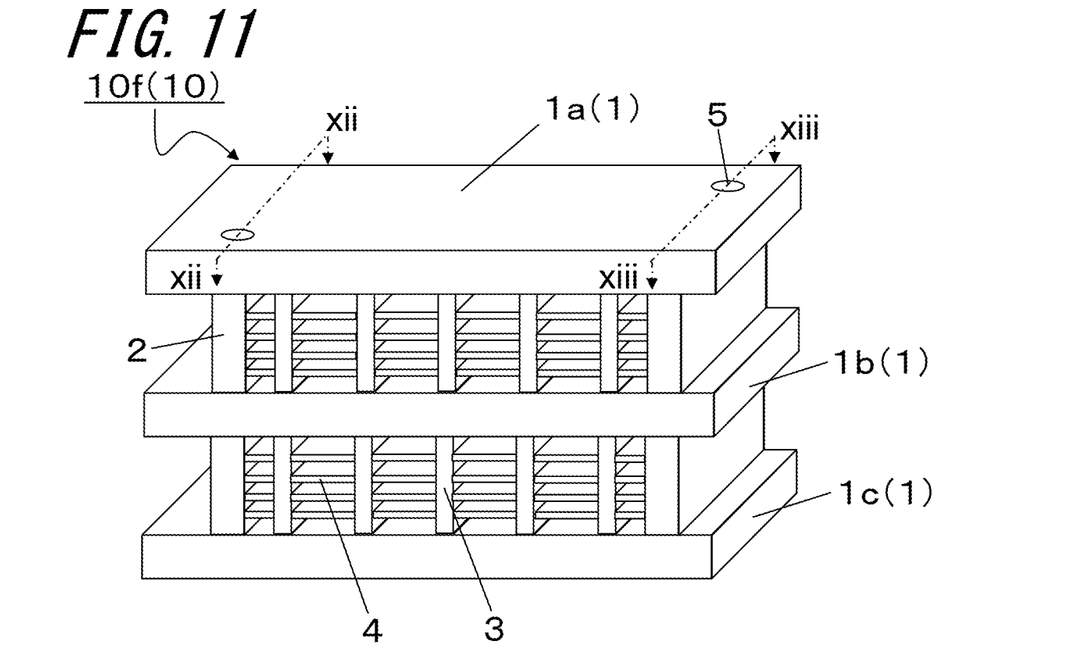
FIG. 11 is an external perspective view showing another example of the heat exchanger according to the disclosure.
Figure 12:
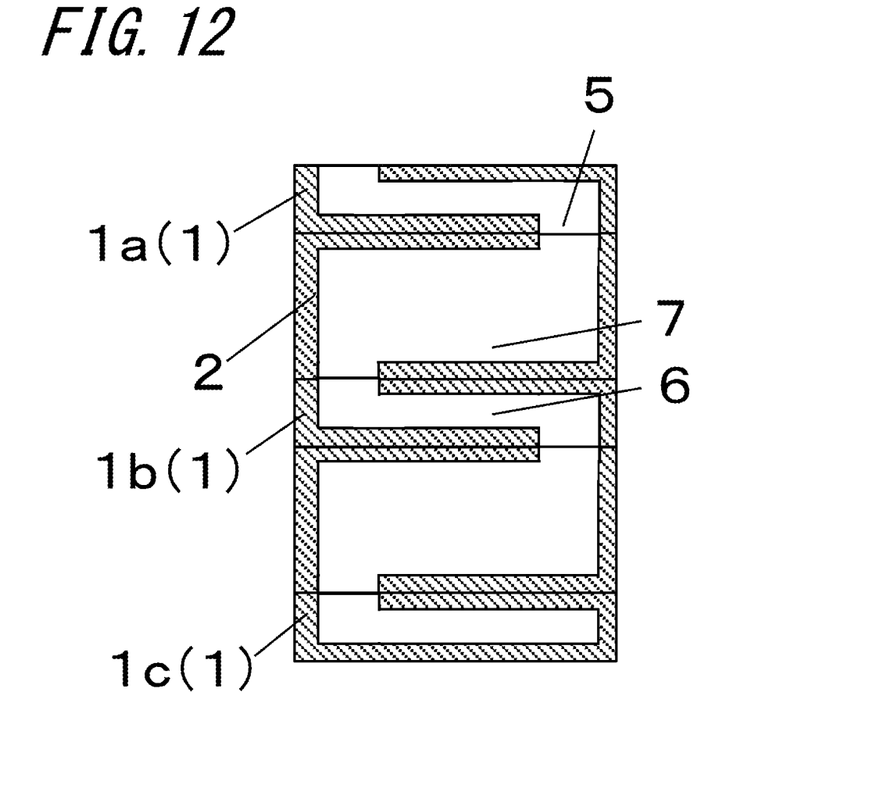
FIG. 12 is a cross-sectional view taken along the line xii-xii in FIG. 11.
Figure 13:
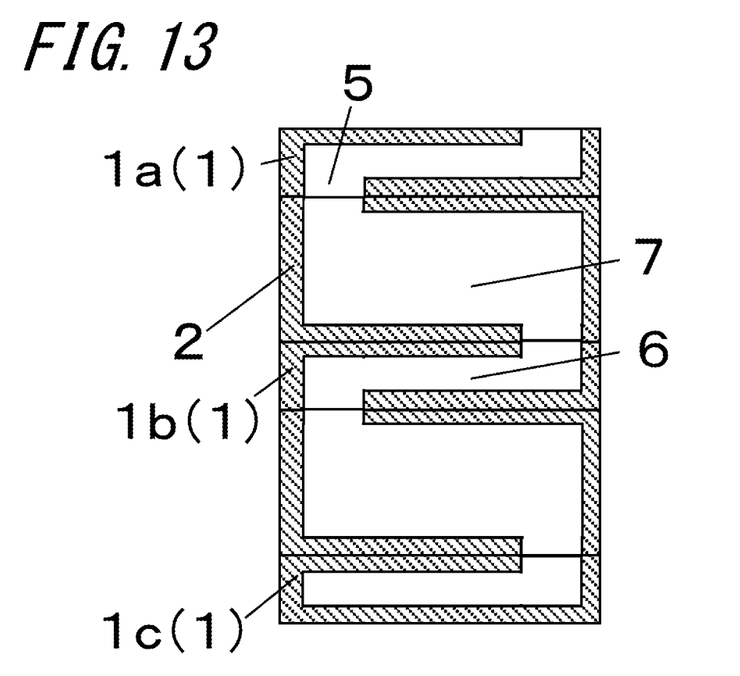
FIG. 13 is a cross-sectional view taken along the line xiii-xiii in FIG. 11.

Moreover, the fourth member 4 may be in contact with the second member 2 as in a heat exchanger 10f shown in FIG. 11. When such a configuration is satisfied, the fourth member 4 is cooled or heated by the first fluid flowing through the second flow path 7 of the second member 2 in contact therewith, so that the heat exchange between the fourth member 4 and the second fluid is performed more efficiently.

In FIG. 10, when the third member 3 and the fourth member 4 have a plate shape, a ratio $H_3/H_4$ may be in a range of 1 or more and 20 or less, wherein $H_3$ denotes an average value of the shortest distances $h_3$ between the adjacent third members 3, and $H_4$ denotes an average value of the shortest distances $h_4$ between the adjacent fourth members 4.

Furthermore, in FIG. 10, a ratio $H_3/T_3$ may be in a range of 2 or more and 25 or less, wherein $T_3$ denotes an average value of thicknesses $t_3$ of third members 3. Then, in FIG. 10, a ratio $H_4/T_4$ may be in a range of 0.5 or more and 2 or less, wherein $T_4$ denotes an average value of thicknesses $t_4$ of fourth members 4.

For example, $H_3$ is in a range of 0.5 mm to 70 mm. For example, $H_4$ is in a range of 2 mm to 15 mm. For example, $T_3$ is in a range of 0.5 mm to 1.5 mm. For example, $T_4$ is in a range of 0.5 mm to 1.5 mm.

The first member 1, the second member 2, the third member 3, and the fourth member 4 that constitute the heat exchanger 10 according to the disclosure may be formed of ceramics. As described above, when the respective members (the first member 1, the second member 2, the third member 3, and the fourth member 4) are formed of ceramics, the heat exchanger 10 according to the disclosure has excellent heat resistance and corrosion resistance. In this example, the type of ceramics may be appropriately selected in accordance with the characteristics of the first fluid and the second fluid, and may be oxide ceramics such as alumina ceramics or cordierite ceramics, or non-oxide ceramics such as silicon nitride ceramics, aluminum nitride ceramics or silicon carbide ceramics. Among these ceramics, when each member is formed of silicon carbide ceramics, the heat exchanger 10 according to the disclosure is excellent in mechanical strength and suitable for miniaturization.

In this example, for example, the silicon carbide ceramics contains 70 mass % or more of silicon carbide in 100 mass % of all the components constituting the ceramics. Then, the material of each member constituting the heat exchanger 10 according to the disclosure can be confirmed by the following method. First, with measurement using the X-ray diffractometer (XRD) each member is measured, and with the value of 2θ (2θ is a diffraction angle) obtained, identification is performed using the JCPDS card. Next, quantitative analysis of the components contained in each member is performed using an inductively coupled plasma (ICP) emission spectrometer (ICP) or a fluorescent X-ray analyzer (XRF). Then, for example, when the presence of silicon carbide is confirmed by the above identification and the content of silicon carbide (SiC) into which the content of silicon (Si) measured by ICP or XRF is converted, is 70 mass % or more, the material is silicon carbide ceramics.

Further, at least one of the first member 1, the second member 2, the third member 3 and the fourth member 4 constituting the heat exchanger 10 according to the disclosure may have a plurality of protrusions on a surface thereof in contact with a region between the adjacent first members 1. In this example, the term "protrusion" refers to a portion of the surface of each member that protrudes from a line connecting portions without protrusions. Then, when such composition is satisfied, the surface area of each member constituting the heat exchanger 10 according to the disclosure is increased by the plurality of protrusions, thereby improving heat exchange efficiency.

The protrusions may be formed of any material, but when the protrusions are formed of the same material as each member, a possibility that the protrusion falls off due to the difference in the thermal expansions between each member and the protrusion is decreased.

In a front view, the protrusions may have an average diameter of 10 μm or more and 60 μm or less. In other words, the front view in this example is a plan view of the surface of each member having the protrusion. When such a configuration is satisfied, the protrusions are less likely to be removed from the respective members, and the surface area of the protrusions may be increased, so that the heat exchange efficiency of the heat exchanger 10 according to the disclosure is improved.

Here, the average diameter of the protrusions in the front view may be calculated by the following method. First, a photograph of the surface of each member having the protrusion as the front view is captured using a scanning electron microscope (SEM). Next, in this photograph, the contour of the protrusion is outlined in black. Thereafter, image analysis is performed using a technique called particle analysis with image analysis software "A-ZO KUN" (registered trademark, manufactured by Asahi Kasei Engineering Co., Ltd.) using the outlined photograph. Then, the average value of the circle equivalent diameters of the respective protrusions calculated by the image analysis may be used as the average diameter of the protrusions in the front view. Further, as the analysis conditions of "A-ZO KUN", for example, the brightness of the crystal grains may be set to "bright", the method of binarization to "automatic", and the shading to "ON".

Further, the heat exchanger 10 according to the disclosure is not particularly limited in its application as long as it performs heat exchange, and for example, may be used as a heat exchanger for various laser devices, for vehicles, for chemical substance recovery devices, for semiconductor elements, and for semiconductor manufacturing equipment, and the like.

Hereinafter, the method of manufacturing the heat exchanger 10 according to the disclosure is described.

First, a method of manufacturing the first member 1 will be described. In the following description, the case where the first member 1 is formed of ceramics will be described as an example.

First, a sintering agent, a binder, a solvent, a dispersant, and the like are added to powders of raw materials (silicon carbide, aluminum oxide, and the like) as main components, and appropriately mixed to prepare a slurry. Next, by using this slurry, a ceramic green sheet is prepared with a doctor blade method. Next, a plurality of ceramic green sheets having arbitrary shapes are laminated by punching using a die or laser processing to prepare a molded body which is a laminated body. Then, by firing this molded body, the first member 1 having the opening 5 and the first flow path 6 is obtained. In this example, by preparing a molded body as the laminated body, it is easy to produce the first flow path 6 inside the first member 1. Further, the thickness of the first member 1 may be adjusted by adjusting the number of ceramic green sheets to be laminated. In addition, the opening 5 may be formed by subjecting the ceramic green sheet to punching with a die or laser processing.

Moreover, when manufacturing the molded body of the first member 1, the portion to be the protrusion may be formed previously. For example, the portion to be the protrusion may be formed by pressing a die having a recess against the surface or scraping the surface by laser processing or blasting. Alternatively, the powder to be the protrusion may be sprinkled on the surface using a sieve or the like.

As another method of preparing a ceramic green sheet, granules may be prepared by spray-drying and granulating a slurry by spray granulation method (spray dry method), and the granules may be prepared by a roll compaction method or a mechanical pressing method.

Next, a method of manufacturing the second member 2 will be described. The molding method for the second member 2 may be selected in accordance with the shape. For example, when the shape of the second member 2 is to be pipe-shaped, the slurry described above may be adjusted with a moldable material and manufactured by extrusion molding. Alternatively, it may be manufactured by using a mechanical pressing method or cold isostatic pressing (CIP) method using the granules described above. Further, when the second member 2 is to be plate-shaped, the ceramic green sheets may be laminated in the same manner as the first member 1 to manufacture a molded body as the laminated body. Then, the second member 2 is obtained by firing a molded body.

In the molded body of the second member 2, the portion to be the protrusion may be formed in advance by the method described above.

Next, a method of manufacturing the third member 3 and the fourth member 4 will be described. The third member 3 and the fourth member 4 are obtained by manufacturing a molded body of a ceramic green sheet by a doctor blade method, a roll compaction method, or a mechanical pressing method, and firing the same in the same manner as for the first member 1.

For the molded bodies of the third member 3 and the fourth member 4, the portions to be the protrusion may also be formed in advance by the method described above.

Then, the heat exchanger 10 according to the disclosure is obtained by bonding the first member 1, the second member 2, the third member 3, and the fourth member 4 using adhesives, respectively. Here, as in the heat exchanger 10*d* of FIG. 7, the heat exchanger 10*e* of FIG. 9, and the heat exchanger 10*f* of FIG. 11, when the configuration has both the third member 3 and the fourth member 4, the third member 3 and the fourth member 4 may be integrally formed by extrusion molding, and may be bonded to the first member 1 using an adhesive.

As the adhesive, any adhesive may be used as long as it may bond the members together, but when an inorganic adhesive is used, the respective members may be securely bonded without deteriorating the respective members when heat treatment is performed. Furthermore, since the inorganic adhesive is excellent in heat resistance and corrosion resistance, the reliability of the heat exchanger 10 according to the disclosure may be improved. In this example, as an inorganic adhesive, for example, $SiO_2$—$Al_2O_3$—$B_2O_3$—RO based glass paste (R: alkaline earth metal element) or a Si—SiC-based paste may be used. In particular, when the first member 1, the second member 2, the third member 3 and the fourth member 4 are formed of silicon carbide ceramics, the high temperature strength of the heat exchanger 10 according to the disclosure may be improved by using, as the inorganic adhesive, a Si—SiC-based paste whose thermal expansion coefficient is similar to that of the silicon carbide ceramics.

Note that the disclosure is not limited to the embodiments described above, and various changes, improvements, and the like are possible without departing from the scope of the disclosure.

REFERENCE SIGNS LIST

1: First member
2: Second member
3: Third member
4: Fourth member
5: Opening
6: First flow path
7: Second flow path
10: Heat exchanger

The invention claimed is:
1. A heat exchanger, comprising:
a plurality of first plate members;
a plurality of second members located between adjacent first plate members of the plurality of first plate members, wherein
the plurality of first plate members each comprise
a plurality of openings, and
a first flow path connected to the plurality of openings,
the plurality of second members each comprise
a second flow path connected to the openings of the adjacent first plate members, and
the plurality of openings and the first flow path of the first plate members, and the second flow path of the second members define a flow path for a first fluid, and a region between the adjacent first plate members defines a flow path for a second fluid;
a plurality of third members extending toward the region on the first plate member,
each of the plurality of third members connecting one of the plurality of first plate members with an other one of the plurality of first plate members, and
a plurality of fourth members, the plurality of fourth members being spaced from the plurality of first plate members,
a first end of at least one of the plurality of fourth members connects to one of the plurality of third members and a second end of the at least one of the plurality of fourth members connects to an other one of the plurality of third members, and
the plurality of fourth members extends from the plurality of third members toward the region, and
at least one of the plurality of fourth members is in contact with corresponding one of the plurality of second members.
2. The heat exchanger according to claim 1, wherein one of the plurality of third members is connected to the one of the plurality of first plate members and the other one of the plurality of first plate members which are transverse to the one of the plurality of third members.

3. The heat exchanger according to claim 1, wherein the plurality of third members are located at intervals.

4. The heat exchanger according to claim 3, wherein widths at an inlet and an outlet of the flow path for the second fluid between adjacent third members of the plurality of third members are different from each other.

5. The heat exchanger according to claim 4, comprising a plurality of flow paths A, wherein the flow paths A indicate the flow paths for the second fluid between the adjacent third members,
wherein adjacent flow paths A have different relationships from each other in width at the inlet and the outlet of the flow path for the second fluid.

6. The heat exchanger according to claim 1,
wherein the plurality of fourth members are located at intervals.

7. The heat exchanger according to claim 1, wherein the plurality of fourth members are connected to the third member which is transverse to the plurality of fourth members.

8. The heat exchanger according to claim 1, wherein the plurality of first plate members, the plurality of second members, the plurality of third members, and the plurality of fourth members are formed of silicon carbide ceramics.

9. The heat exchanger according to claim 1, wherein at least one of the plurality of first plate members, the plurality of second members, the plurality of third members, and the plurality of fourth members comprises a plurality of protrusions on a surface thereof in contact with the region.

10. The heat exchanger according to claim 9, wherein the plurality of protrusions have an average diameter of 10 μm to 60 μm in a front view of the surface.

11. The heat exchanger according to claim 1, wherein at least one of the plurality of fourth members connects one of the plurality of third members to one of the plurality of second member.

12. A heat exchanger, comprising:
a plurality of first plate members;
a plurality of second members located between adjacent first plate members of the plurality of first plate members, wherein
the plurality of first plate members each comprise
a plurality of openings, and
a first flow path connected to the plurality of openings,
the plurality of second members each comprise
a second flow path connected to the openings of the adjacent first plate members, and
the plurality of openings and the first flow path of the first plate members, and the second flow path of the second members define a flow path for a first fluid, and a region between the adjacent first plate members defines a flow path for a second fluid;
a plurality of third members extending toward the region on the first plate member,
each of the plurality of the third members connecting one of the plurality of first plate members with an other one of the plurality of first plate members, and
a plurality of fourth members, the plurality of fourth members being spaced from the plurality of first plate members, and
a first end of at least one of the plurality of fourth members connects to one of the plurality of third members and a second end of the at least one of the plurality of fourth members connects to an other one of the plurality of third members,
wherein the plurality of third members are located at intervals, and
wherein widths at an inlet and an outlet of the flow path for the second fluid between adjacent third members of the plurality of third members are different from each other.

13. A heat exchanger, comprising:
a plurality of first plate members;
a plurality of second members located between adjacent first plate members of the plurality of first plate members, wherein
the plurality of first plate members each comprise
a plurality of openings, and
a first flow path connected to the plurality of openings,
the plurality of second members each comprise
a second flow path connected to the openings of the adjacent first plate members, and
the plurality of openings and the first flow path of the first plate members, and the second flow path of the second members define a flow path for a first fluid, and a region between the adjacent first plate members defines a flow path for a second fluid;
a plurality of third members extending toward the region on the first plate member,
each of the plurality of the third members connecting one of the plurality of first plate members with an other one of the plurality of first plate members, and
a plurality of fourth members, the plurality of fourth members being spaced from the plurality of first plate members, and
a first end of at least one of the plurality of fourth members connects to one of the plurality of third members and a second end of the at least one of the plurality of fourth members connects to an other one of the plurality of third members,
wherein the plurality of fourth members extends from the plurality of third members toward the region, and
wherein at least one of the plurality of first plate members, the plurality of second members, the plurality of third members, and the plurality of fourth members comprises a plurality of protrusions on a surface thereof in contact with the region.

* * * * *